July 27, 1954 J. H. HASLAM 2,684,972
PRODUCTION OF INORGANIC ESTERS
Filed Feb. 21, 1952
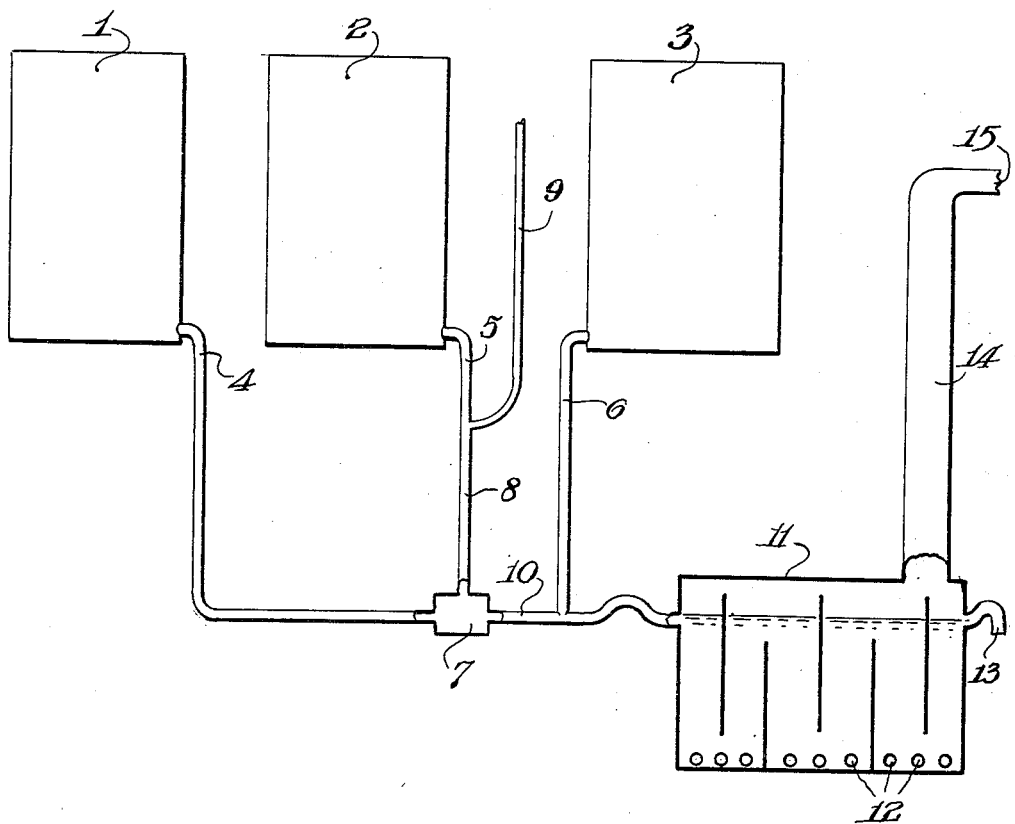
INVENTOR.
John H. Haslam
BY
ATTORNEY.

Patented July 27, 1954

2,684,972

UNITED STATES PATENT OFFICE 2,684,972

PRODUCTION OF INORGANIC ESTERS

John H. Haslam, Wilmington, Del., assignor to E. I. du Pont de Nemours and Company, Wilmington, Del., a corporation of Delaware Application February 21, 1952, Serial No. 272,772

10 Claims. (Cl. 260—429)

This invention relates to novel and improved methods for preparing inorganic esters and more particularly to the preparation of the esters of orthotitanic acid with tertiary and other active alcohols.

The preparation of inorganic esters by reacting certain elements or their compounds, particularly their halides, with alcohols, is already known. The ester-forming elements, titanium, zirconium, silicon, aluminum, boron, and the like, form esters of the interaction of their chlorides with an alcohol as is illustrated in the following equation:

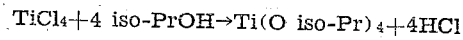

$$TiCl_4 + 4 \text{ iso-PrOH} \rightarrow Ti(O \text{ iso-Pr})_4 + 4HCl$$

It is also known that the yields, based on the inorganic halide reactant are usually very low unless provision is made for the removal of HCl. The need for HCl removal may be due in part to reversibility of the reaction, but more often is due to a side reaction, especially in the case of active alcohols such as the tertiary and allyl types, which produces an organic chloride and water.

In order to increase the amount of the ester formed in the reaction, alkaline agents are resorted to as acid acceptors. These agents must be non-aqueous and should not form water when reacting with HCl. Thus, metallic sodium has been used for this purpose by first forming the sodium alcoholate which is then reacted with the halide reactant forming the ester and sodium chloride. Sodium use having proved expensive and tedious, resort to recoverable amines and anhydrous ammonia has been had. Thus, U. S. Patent 2,187,821 contemplates a process for reacting hydrocarbon hydroxy compounds with titanium tetrachloride in the presence of amines or ammonia. When, however, attempts to use active alcohols such as tertiary butanol in such process are made, these result in failure (Cullinane and Chard, Nature, vol. 164, No. 4173, p. 710, Oct. 22, 1949).

I have now discovered an improved method for reacting ester-forming inorganic halogen compounds with active alcohols to obtain inorganic esters in improved, high yield, and that advantageously titanium esters of reactive hydroxy compounds such as the tertiary alcohols, allylic alcohols, and a-keto alcohols, can be so prepared.

These improved yields and other advantageous results of my invention are attained by reacting a halide of certain polyvalent ester-forming elements having a valence of at least 3 and an atomic number greater than 12 and less than 57, such as titanium, zirconium, iron, phosphorus, arsenic, antimony, tin, and the like, with anhydrous ammonia to form ammoniated compounds of said elements, subjecting the resulting ammoniated compounds to reaction with an active organic hydroxy compound of the type mentioned, and thereafter recovering the inorganic ester product.

In practically adapting the invention, the ammoniated compound can be prepared in an isolated state and then reacted with the alcohol to form the desired ester. The latter can then be recovered and purified in accordance with conventional, known procedures. Preferably, however, the ammoniated compound is formed by passing anhydrous ammonia into a solution of the halide reactant, such as TiCl4, in an inert organic solvent and the ammoniated intermediate which forms is then mixed with an active alcohol such as tertiary butyl alcohol, the ester-forming reaction being then effected by heating the mixture, after which the metal ester product is suitably recovered. Alternatively, the ammoniated compound can be formed directly in the presence of the hydroxy compound thereby obtaining reaction between the ammoniated compound and the hydroxy compound subsequent to formation of the former. Thus the halide compound can be added to ammoniacal alcohol containing enough ammonia to form the ammonia complex, and the resulting mixture can be then heated to complete the reaction with the alcohol.

The reaction between the ammoniated compound and alcohol is sometimes relatively slow at room temperature. Hence, the reaction mixture can be advantageously heated to speed the reaction toward completion. Surprisingly, the use of heat in my process results in increased, excellent ester yields whereas previously it has been common practice in ester production to resort to external cooling to prevent undesired side reactions, particularly in instances of active alcohol use. Hence, in a preferred embodiment of the invention, the active alcohol is reacted with the ammoniated intermediate at a temperature above 40° C.

In the accompanying drawing, comprising a side elevational view of one form of apparatus in which the invention can be carried out, there is shown a plurality of storage vessels 1, 2 and 3 having, respectively, valve-controlled or other forms of withdrawal or outlet conduits 4, 5 and 6. Within vessel 1 a supply of an ester-forming metal halide dissolved in an organic, preferably a hydrocarbon, solvent such as cyclohexane, n-heptane, benzene, toluene, xylene, etc., is adapted to be maintained for use and reaction in the system. Within the vessel 2 a supply of a suitable solvent such as those mentioned to be admixed, as will presently appear, with anhydrous NH₃, is maintained; while a supply of the active alcoholic compound reactant to be utilized in the process is maintained within vessel 3. Withdrawal outlet 4 of vessel 1 discharges into a suitable mixing zone 7 which also communicates with and is adapted to receive upon formation within the mixing conduit 8 an ammoniated intermediate derived from the feeding into and mixing within the conduit 8 of solvent withdrawn from vessel 2 through conduit 5 and anhydrous NH₃ from the conduit 9 which leads from a source of supply (not shown). An outlet conduit 10 leads from the zone 7 through which the ammoniated compound formed within said zone is withdrawn. The line 10 communicates with withdrawal conduit 6 leading from the alcohol reactant supply vessel 3 and discharges into a heated, baffled digestion chamber 11 provided with suitable electrical, steam, or other form of heating coils 12 and an outlet 13. An associated refluxing tower 14 is also provided with said chamber together with an outlet 15 therefor.

In operating a device of the type just described to produce, for example, titanium esters in accordance with the invention, the TiCl₄ dissolved in a suitable solvent enters the mixing zone 7 via main pipe line 4. Anhydrous ammonia is fed into the mixing conduit 8 from the line 9 to become dissolved in the solvent concurrently entering the conduit 8 from the line 5. The ammonia solution becomes homogeneous in the conduit or zone 8 and is then injected into the stream of TiCl₄ solution being discharged into the zone 7. With proper adjustment of pipe diameters and flow rates the mixing is very rapid in the latter zone. As a result of this rapid mixing, the ammoniated titanium compound is formed in particles of colloidal or almost molecular size. Coagulation of these small particles soon begins so it is preferable to feed the alcohol reactant from vessel 3 through 6 into the discharge line 10 a relatively short distance from the zone 7 but preferably after mixing and the first reaction is complete. If desired, the alcohol can be fed hot to increase the reaction rate. The very fine or colloidal ammoniated compound reacts rapidly and quite completely with the alcohol to form finely dispersed ammonium chloride which, during the greater part of the second reaction, exerts rather small blinding effects on the ammoniated solids. To complete the reaction and grow the ammonium chloride crystals to a filterable size, the reaction products are discharged into the digestion chamber 11 wherein they are maintained at a temperature above 40° C. and to about 80° C. The crude reaction products leave the digestion chamber at 13 and can be suitably worked up as previously indicated. Escape of excess ammonia and refluxing of solvent is effected by means of the column 14 and outlet 15. By proper adjustment of pipe sizes, concentrations, flow rates, and retention time, high, improved yields of the iron, titanium and zirconium esters of around 95% are readily obtained even with the heretofore difficultly utilizable active alcohols.

To a clearer understanding of the invention, the following examples are given which are merely illustrative and not to be construed as in limitation of its underlying principles:

Example I 190 gms. of TiCl₄ can be dissolved in 1500 ml. of dry cyclohexane in a flask fitted with suitable means which will afford good agitation as well as a gas inlet tube reaching just under the stirrer. With accompanying good agitation dry ammonia can be bubbled in until an excess thereof becomes present. The titanium chloride will precipitate as a yellow solid having the approximate composition of TiCl₄.8NH₃. Upon well dispersing this precipitate, the suspension can be slowly transferred, while excluding moisture (by pouring through a connecting glass tube having spherical joints, under a blanket of dry nitrogen) into a second agitated flask and reflux condenser containing 750 gms. boiling tertiary butyl alcohol. The yellow solid will appear to turn white as the reaction proceeds to become converted into ammonium chloride, tetrabutyl titanate and ammonia, in accordance with the equation:

$$TiCl_4.8NH_3 + 4BuOH \rightarrow Ti(OBu)_4 + 4NH_4Cl + 4NH_3$$

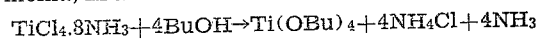

After 4 hours of agitation and refluxing the crystalline ammonium chloride can be filtered out under anhydrous conditions and the solvent distilled from the filtrate. The product can be vacuum distilled to yield 310 gms. of tertiary butyl titanate B. P. 59–60° C. at 0.3 mm. Yield: —91%.

Example II

The procedure of Example I can be repeated, substituting tertiary amyl alcohol for the tertiary butanol to obtain an 85% yield of tetra tertiary amyl titanate.

Example III 750 gms. of allyl alcohol at 80° C. can be saturated with anhydrous ammonia under a pressure of 45 p. s. i. gauge. A solution of 200 gms. TiCl₄ in 1000 gms. of n-hexane can be added slowly thereto with good agitation and while the 45 p. s. i. ammonia pressure is maintained over the reaction mixture. This addition can be effected over a period of one hour. After another hour of agitation at 80° C. the pressure can be released allowing the mixture to cool first due to release of ammonia and a mixture of hexane and alcohol and then by external cooling thereof. The solid ammonium chloride can be separated by filtration and washing under anhydrous conditions. On distillation of the filtrate to remove solvent and excess alcohol therefrom and vacuum fractionation of the residue, an 87% yield of allyl titanate, based on the TiCl₄ used, can be obtained.

Example IV

Tertiary butyl titanate can be prepared continuously by simultaneously feeding an ammoniated titanium tetrachloride suspended in n-heptane into a mixing chamber along with a 75% solution of tertiary butanol in n-heptane. The alcohol solution can be introduced at about the boiling point of the heptane-butanol azeotrope (78° C.) and the mixture discharged into a series of four mixers heated to reflux temperature. Ammonia gas evolved from the reaction can be returned to the process. The last mixer can be discharged through a pump to a pressure filter. The filtrate can be flash distilled to remove solvent and excess alcohol and the residue vacuum fractionated to yield tetra tertiary butyl titanate. By adjusting flows so that one mol of ammoniated TiCl₄ per 10 mols of butanol are mixed, and the total retention time in the mixers is about one hour, yields in the order of 90–95% will result. The azeotrope and solvent can be recycled to the feed.

Example V

In a three-liter flask fitted with heating means, reflux condenser, drying tubes, strong agitator, gas inlet tube, and a funnel for adding liquid, one mol, 154 gms., of POCl₃ is introduced and dissolved in one liter of n-heptane. During agitation, ammonia gas is bubbled in until the system is saturated to provide a precipitate of the phosphoryl chloride-ammonia complex. This precipitate is dispersed as much as possible and during continued agitation the ammonia flow is stopped and four mols, 232 gms., of dry allyl alcohol is added. Heat is then applied to cause refluxing for two hours, the agitation being maintained to disperse the solids. Ammonia evolves during the refluxing. After cooling, the reaction product is filtered to remove ammonium chloride and the clear filtrate distilled to remove solvent and excess allyl alcohol, using reduced pressure for the final stripping. Two grams of symmetrical dibetanaphthyl p-phenylenediamine are added to inhibit polymerization during the product distillation. The crude residue containing the inhibitor is subjected to vacuum distillation, yielding 84 gms. of triallyl phosphate boiling at 73–77° C. at 0.25 mm. to correspond to a 40% yield from the POCl₃.

Example VI

One mol, 228 gms., of SbCl₃ can be dissolved in 1.5 liters of dry benzene in an apparatus such as that described in Example V. Anhydrous ammonia can be bubbled into the solution, during good agitation, to saturation. 350 ml. of dry n-butanol alcohol can be added to the reaction mixture which is then agitated and refluxed with the usual protection from atmospheric moisture for a period of 4 hrs. The product mixture can be cooled and filtered under dry nitrogen to remove ammonium chloride. The clear filtrate is stripped of solvent and excess alcohol and the residue vacuum distilled to yield 220 gms. of distillate boiling at 133–135° C. and 4 mm., analyzing 36% antimony and corresponding closely to tributyl antimonite which theoretically contains 35.5% Sb.

Example VII 200 gms. of anhydrous FeCl₃ is suspended in 1.5 liters of n-heptane in the flask of an apparatus similar to that of Example V and the mixture saturated with ammonia during good agitation. 350 gms. of dry terbutyl alcohol are then added and the mixture agitated and refluxed for 5 hrs. The mixture is cooled and the ammonium chloride filtered out under moisture-free conditions. The solvent and excess alcohol are stripped off and the viscous red residue dissolved in fresh dry heptane and filtered. On analysis for iron and chlorine, only a trace of chlorine will be found to be present in the solution, with the iron content corresponding to 90% of that originally in the FeCl₃ used, e. g., a 90% yield of a ferric ester will result.

While the invention has been described as applied to certain specific embodiments, it will be understood that it is not restricted thereto. Thus, while reactive organic hydroxy compounds of the type mentioned in the examples are preferred for use, employment is generally contemplated of hydroxy compounds selected from the group consisting of tertiary alcohols, allylic alcohols (derived from olefines and other unsaturated hydrocarbons and in which the double bond is attached to a carbon once removed from the carbon containing the OH substituent) and a-keto alcohols. Tertiary alcohols corresponding to the formula R₃COH in which R is an alkyl or aryl radical, and particularly those having an alkyl hydrocarbon group containing from 1–5 carbon atoms, such as methyl, ethyl, propyl, butyl, pentyl, are especially utilizable. Examples of specific hydroxy compounds contemplated for use include tertiary butyl alcohol, tertiary amyl alcohol, tertiary propyl alcohol, 1-methylcyclopentanol, etc., triphenyl alcohol, allyl acohol, acetyl-carbonol, aceto propyl alcohol, aceto butyl alcohol, etc. Similarly, while chlorides of such metals as titanium, zirconium, iron, phosphorus, antimony, and tin, are mentioned, other halides of these metals, including the bromides and iodides thereof, can be used. Again, while temperatures ranging from 40–80° C. are preferred for use herein, the use of temperatures ranging up to the boiling point of the reactive alcohol used can also be resorted to.

It will be understood that the process is operable under any desired pressure to provide complete solution of the ammonia in its solvent, and also to permit recourse to elevated temperatures beyond the normal boiling point of the liquids utilized in the system. Also, in an alternative operation the ammonia gas can be injected directly into the metal chloride, particularly the titanium tetrachloride, solution, or can be introduced into the system in the necessary amount while admixed with the hydroxy compound.

The quantity of ammonia used in forming the ammoniated intermediate should be sufficient to provide at least one nitrogen atom for each halogen atom in the metal addition product. Thus, with the preferred titanium halide reactant the amount of NH₃ should be such that at least four atoms of nitrogen are associated or combined with each titanium atom. A satisfactory, stable form of ammonia addition compound comprises TiCl₄.8NH₃. When this compound is used, ammonia addition during the reaction is not required.

In reacting the ammoniated compound, it is desirably in as fine a state of subdivision as possible. Being insoluble in the commonly available organic solvents, it is advantageous to use rigorous agitation or grinding action during its formation and prior to and during its reaction with the hydroxy compound. If desired, low temperatures can be used, as can suitable dispersing agents, to produce the ammoniated compound in dispersed, colloidal state, thus giving a more rapid and complete reaction in the subsequent ester-forming reaction. Another factor influencing the rate and completeness of the reaction is the blinding of the complex solid with the solid ammonium chloride by-product. To keep exposing the ammonia complex to the alcohol, the reaction mixture is preferably agitated or even subjected to a grinding action.

It is also possible to take advantage of the slight solubility of ammonium chloride in an excess of the alcohol. To do this the solid tetrachloride ammonia complex free of solvent is prepared and added to the alcohol, preferably at an elevated temperature, using pressure if desired to increase the temperature above the normal boiling temperature. This method is difficult, however, due to the preparation and handling of the ammoniated compound under anhydrous conditions.

Good reaction conditions relative to the foregoing factors can be obtained as shown in Example III wherein the titanium tetrachloride ammonia complex is reacted as rapidly as it is formed. Under these conditions the alcohol is saturated with NH₃ and an excess is always provided. Because of the high content of ammonia the titanium tetrachloride reacts first with the ammonia and the ammoniated product then reacts with the alcohol. The high yield in a relatively short time appears to be due in part to the minimum of blinding by ammonium chloride and the large active surface of the newly formed ammoniated compound. Saturation of the alcohol with ammonia at atmospheric pressure and continuing the addition of ammonia along with the addition of the TiCl₄ will accomplish a satisfactory result.

In contrast to the high (90% or more) yields attained herein, the yields from prior procedures are of the order of 40% and at most 75%. Since the yield advantage of this invention is greatest with the active alcohols, it will be found to be most advantageous for the preparation of such inorganic esters as tetra tertiary butyl titanate, tetra allyl titanate, tetra tertiary amyl titanate, tetra a-keto propyl titanate, their homologues, and similar esters of zirconium, antimony, phosphorus, iron, etc.

The detailed mechanism of the reactions involved in my novel procedure is not presently thoroughly understood. The following is suggested in explanation of the superior results achieved by my new method:

In previous methods wherein the simple TiCl₄ is reacted with the alcohol and then the ammonia is reacted with the resulting HCl, there is considerable opportunity for the following set of reactions to take place:

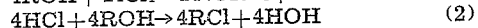
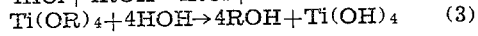

$$4ROH + TiCl_4 \rightarrow Ti(OR)_4 + 4HCl \quad (1)$$
$$4HCl + 4ROH \rightarrow 4RCl + 4HOH \quad (2)$$
$$Ti(OR)_4 + 4HOH \rightarrow 4ROH + Ti(OH)_4 \quad (3)$$

Thus, any HCl escaping the ammonia results in loss of ester yield particularly in the case of active alcohols where reactions 2 and 3 are rapid and low yields result.

In this invention, the ammonia is combined with the TiCl₄ molecule, thus placing it in molecular proximity to the reaction and thereby greatly reducing the chances of any reaction between the liberated HCl and another alcohol molecule.

It is quite possible that the ammonia complex decomposes, at the higher temperatures used, to give ammonium chloride and the titanium tetramine:

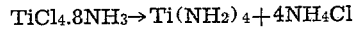

$$TiCl_4 \cdot 8NH_3 \rightarrow Ti(NH_2)_4 + 4NH_4Cl$$

The tetramine may then react as follows:

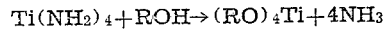

$$Ti(NH_2)_4 + ROH \rightarrow (RO)_4Ti + 4NH_3$$

If the reaction follows this route, then there is no possibility of forming the organic chloride and water to result in a low yield. Too, it is possible that other compounds intermediate between TiCl₄·8NH₃ and Ti(NH₂)₄ may form and react with the alcohol. Both these compounds and the intermediates are included in the term "ammoniated compound." Similar ammoniated compounds are formed with the other ester-forming elements involved.

Previously, investigators have encountered difficulty in separating the sodium chloride by-product in instances where sodium alcoholates are used. Consequently, frequent resort has been had to heating or refluxing of the reaction mixture to increase the crystal size and thus improve the filterability of the salt. Cullinane, in the above Supplementary Issue No. 1, p. S39, reports that when ammonia is used the refluxing of the reactants should be avoided since it diminishes the yield considerably. When using the method of this invention the reaction mixture may be refluxed throughout the preparation, thus gaining improved filterability along with the excellent yields in relatively short reaction time. Both the refluxing and the elimination of the expensive organic amines such as pyridine result in economic advantages realized by my improved method. The chief advantage of my process is realized in the high and unexpected yields obtained when using such active alcohols as tertiary alcohols and allyl alcohol, etc. Yields of ferric esters in general have been low in prior methods but are greatly improved by this invention. The invention is also applicable to the preparation of esters of aluminum and boron.

I claim as my invention:

1. A process for preparing an organic metal ester which comprises reacting an organic hydroxy compound selected from the group consisting of tertiary alcohols, allylic alcohols, and keto alcohols, with the ammonia addition product of a halide of an ester-forming polyvalent metal having a valence of at least 3, and an atomic number greater than 12 and less than 57, said addition product containing at least one nitrogen atom for each atom of halogen in said ester-forming halide.

2. A process for preparing an organic metal ester which comprises reacting a halide of an ester-forming polyvalent metal having a valence of at least 3, and an atomic number greater than 12 and less than 57, with anhydrous ammonia to form an ammoniated metal halide compound containing at least one nitrogen atom for each atom of halogen in said metal halide, reacting said ammoniated compound with an active organic hydroxy compound selected from the group consisting of tertiary alcohols, allylic alcohols, and keto alcohols, and recovering the resulting metal ester reaction product.

3. A process for preparing an organic metal ester which comprises reacting a chloride of an ester-forming polyvalent metal having a valence of at least 3 and an atomic number greater than 12 and less than 57, with anhydrous ammonia to form an ammoniated metal chloride compound containing at least one nitrogen atom for each atom of halogen in said metal chloride, reacting said ammoniated compound with an active organic hydroxy compound selected from the group consisting of tertiary alcohols, allylic alcohols, and keto alcohols, and recovering the resulting metal ester reaction product.

4. A process for preparing an organic titanium ester which comprises reacting a titanium halide with anhydrous ammonia to form an ammoniated metal chloride compound containing at least one nitrogen atom for each atom of halogen in said metal chloride, reacting said ammoniated compound at a temperature of at least 40° C. with an active organic hydroxy compound selected from the group consisting of tertiary alcohols, allylic alcohols, and keto alcohols, and recovering the resulting metal ester reaction product.

5. A process for preparing an organic ester of orthotitanic acid which comprises reacting titanium tetrachloride and anhydrous ammonia to form an ammoniated compound of said tetrachloride containing at least 4 nitrogen atoms for each atom of titanium present, then reacting said ammoniated compound with an active alcohol selected from the group consisting of tertiary alcohols, allylic alcohols, and keto alcohols, and separating and recovering the orthotitanic ester from the resulting reaction products.

6. A process for the preparation of an organic orthotitanic ester which comprises reacting an admixture of titanium tetrachloride and anhydrous ammonia in which at least 4 nitrogen atoms are present for each atom of titanium, reacting said admixture with an active alcohol selected from the group consisting of tertiary alcohols, allylic alcohols, and keto alcohols, effecting said reaction at temperatures ranging from 40° C. to the boiling point of the alcohol, separating the resulting ammonium chloride crystals and recovering the orthotitanic ester product.

7. A process for preparing tetra tertiary butyl titanate which comprises reacting anhydrous ammonia and titanium tetrachloride to form $TiCl_4.8NH_3$, thereupon subjecting this addition product to reaction with tertiary butyl alcohol, and recovering the tetra tertiary butyl titanate product.

8. A process for preparing an allyl titanate which comprises reacting anhydrous ammonia and titanium tetrachloride to form $TiCl_4.8NH_3$, thereupon reacting the latter with allyl alcohol, and recovering the resulting allyl titanate.

9. A process for preparing an a-keto titanate which comprises reacting anhydrous ammonia and titanium tetrachloride to form $TiCl_4.8NH_3$, thereupon reacting the latter with a-keto alcohol and recovering the resulting a-keto titanate.

10. A process for continuously preparing an organic ester or orthotitanic acid which comprises continuously flowing titanium tetrachloride dissolved in an inert organic solvent into anhydrous ammonia also dissolved in an organic solvent, employing in the mixing operation amounts of tetrachloride and ammonia sufficient to form an addition product containing at least 4 nitrogen atoms for each atom of titanium present in said product, upon substantial completion of the reaction between the ammonia and tetrachloride mixing and reacting a tertiary alcohol therewith and thereafter recovering the orthotitanic acid ester.

References Cited in the file of this patent

UNITED STATES PATENTS

| Number | Name | Date |
|---|---|---|
| 2,408,744 | Engel | Oct. 8, 1946 |
| 2,495,958 | Craig et al. | Jan. 31, 1950 |

FOREIGN PATENTS

| Number | Country | Date |
|---|---|---|
| 547,148 | Great Britain | Aug. 17, 1942 |

OTHER REFERENCES

Cullinane et al.: Jour. of the Society of Chemical Industry, vol. 69, No. 1, September 1905, page S38 to S40.

Nature, vol. 165, pages 75–76, January 14, 1950.

Gerrard et al.: J. Chem. Soc., 1950, pages 2088–92.